(12) United States Patent
Kushnirskiy et al.

(10) Patent No.: US 7,069,562 B2
(45) Date of Patent: Jun. 27, 2006

(54) APPLICATION PROGRAMMING INTERFACE FOR CONNECTING A PLATFORM INDEPENDENT PLUG-IN TO A WEB BROWSER

(75) Inventors: Igor Davidovich Kushnirskiy, Sunnyvale, CA (US); Sergi Pikalev, St. Petersburg (RU)

(73) Assignee: Sun Microsystems, Inc., Palo Alto, CA (US)

( * ) Notice: Subject to any disclaimer, the term of this patent is extended or adjusted under 35 U.S.C. 154(b) by 448 days.

(21) Appl. No.: 10/021,915

(22) Filed: Dec. 12, 2001

(65) Prior Publication Data

US 2003/0126311 A1 Jul. 3, 2003

(51) Int. Cl.
G06F 9/00 (2006.01)
(52) U.S. Cl. ..................................... 719/328
(58) Field of Classification Search ............... 719/310, 719/328
See application file for complete search history.

(56) References Cited

OTHER PUBLICATIONS

Bandhauer, "A zero generated code XPConnect proposal", Dec. 1998, The Mozilla Organization, pp. 1-6.*
Kushnirshiy, "Java Pluglet API", Jul. 2001, The Mozilla Organization, pp. 1-3.*
Burns, "Intergration of the Java Platform with Mozilla", Aug. 2001, The Mozilla Organization, pp. 1-7.*
Burns, "Adding Java Platform Value to Mozilla", Mar. 2001, The Mozilla Organization, pp. 1-11.*

* cited by examiner

Primary Examiner—William Thomson
Assistant Examiner—Phuong N. Hoang
(74) Attorney, Agent, or Firm—Sonnenschein Nath Rosenthal LLP (57) ABSTRACT

Embodiments of the present invention relate to the implementation of an Application Programming Interface (API) that enables platform independent plug-ins to work with browser applications. In one or more embodiments of the present invention, the API allows platform independent plug-ins to use XPCOM (Cross Platform Component Object Model), a technology that allows software components of different various programming languages to communicate. In one or more embodiments of the present invention, the API enables platform independent plug-ins to take advantage of existing BlackConnect and Scriptable Plug-In API technologies to integrate with the native plug-in API. Embodiments of the present invention ensures backward code compatibility by allowing the current platform independent plug-in API and browser API to remain unchanged. Furthermore, embodiments of the present invention enables platform independent plug-ins to communicate and use components created in native programming languages such as C++. This promotes component reuse and eases the development effort.

3 Claims, 8 Drawing Sheets

FIGURE 1

RELATED ART

Figure 2

RELATED ART

APPLICATION PROGRAMMING INTERFACE FOR CONNECTING A PLATFORM INDEPENDENT PLUG-IN TO A WEB BROWSER

Portions of the disclosure of this patent document contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to an Application Programming Interface (API) that allows platform independent plug-ins to work with native web browsers.

2. Background Art

Plug-ins are software modules that extend functionality of a web browser. A common use of plug-ins is to extend the browser support for specialized content such as animation. As browser makers cannot account for all the types of content that are used on the web, plug-ins provide a mechanism for content makers to create software modules that enable browsers to display the specialized content. For example, a certain software company may create a new animation format for viewing on the web. The software company then must create a plug-in designed to allow browsers to view the new animation format. When a user encounters the animation format on a web page, he must download the plug-in and install it before he can view the animation on his browser.

Plug-ins are created to fit uniquely the browsers to which they are being installed. For example, a plug-in made for Internet Explorer™ will not work for Netscape Navigator™. Furthermore, a plug-in made for the Windows version of Netscape Navigator™ will not work with the Solaris™ operating system version. Because of this, software programmers implementing plug-ins must be concerned with the details of all browser types, making plug-in development difficult and non-portable.

To overcome this limitation, there is a mechanism that allows programmers to develop plug-ins using a platform independent programming language such as Java™. Developing in Java™ allows plug-ins to be developed for all types of browser for which a Java™ interface has been created. Using Java™, programmers do not need to create different versions of a plug-in for different platforms (the different types of browser and the computer systems on which they execute are collectively referred to as platforms). Although this technique offers considerable improvement, it still has shortcomings. Before further discussing the shortcomings, an overview of platform independent programming language is provided.

Platform Independent Programming Language

Traditionally each type of computer operating system requires programmers to develop software in a certain set of unique programming languages. As a large number of computers become inter-connected via the Internet, the diversity of computer system (platform) creates a need for a platform independent programming language that runs on all platforms. A platform independent programming language allows computer programmers to develop programs that execute without regard to the execution platform.

An example of a platform independent programming language is Java™. Java™ differs from other programming languages in how programs are compiled and executed. In other programming languages programs are usually compiled into machine-dependent executable code. For example, a program written for an Unix system is compiled into executable code used specifically by an Unix system. The compiled code cannot be executed on another system. In Java™, programs are compiled into platform independent bytecode classes. These byetcode classes contain code and data in a platform independent format called the class file format. The platform independence in Java™ is achieved by having a uniform execution agent called a virtual machine. In Java™, the virtual machine takes on the responsibility of executing the compiled bytecode classes by translating them into platform-specific instructions and sending the instructions to the underlying computer system. This shields the classes from having to interact with the underlying computer platform. Thus the classes can be executed on any platform, as long as a virtual machine is present.

Sample Network Application Environment

Figure 1:
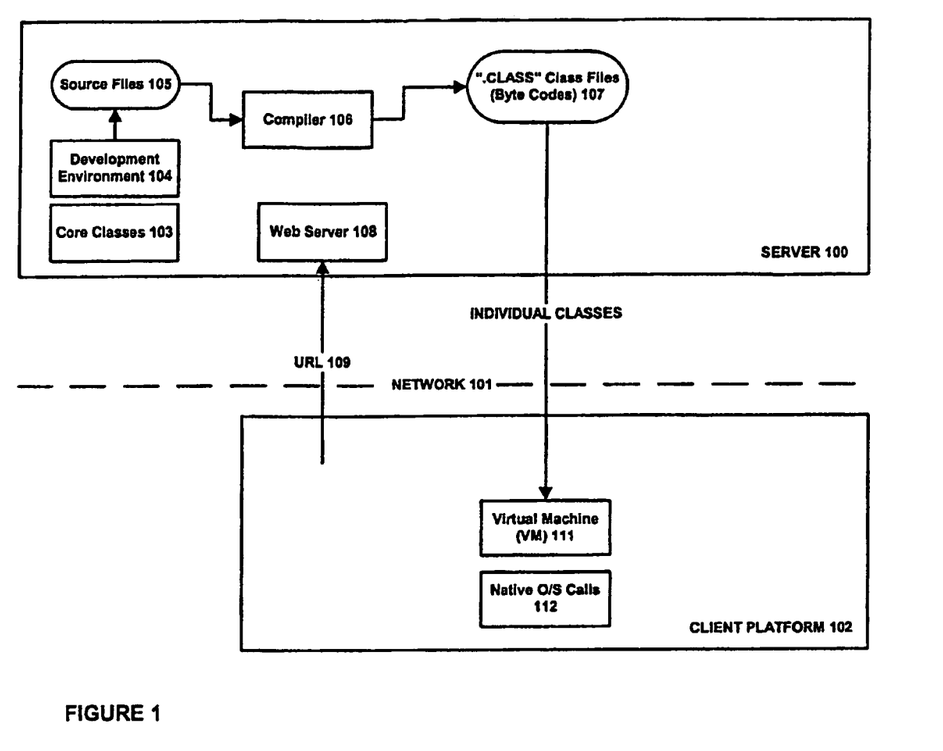
FIG. 1 is a diagram of a sample network application environment.

One common application of a platform independent programming language such as Java™ is its usage in a networking environment. FIG. 1 is a block diagram illustrating a sample network application environment such as a Java™ network application environment. This diagram helps one understand how platform independent programs are created and executed in a network environment such as the Internet. Such an environment comprises of a client platform 102 coupled over a network 101 to a server 100 for the purpose of accessing class files for execution of a software application or applet. An applet is a smaller application, written in Java™, that is commonly downloaded and executed across a network.

In FIG. 1, server 100 comprises development environment 104 for use in creating the source files for a given application. The development environment 104 provides a mechanism, such as an editor and an applet viewer, for the programmer to generate source files and preview applets. A set of core classes 103 comprise a library of commonly used functions that the programmer can reference. From development environment 104, the programmer creates one or more source files 105. Source files 105 contain class definitions, including data structures, method implementations and references to other classes. Source files 105 are provided to compiler 106, which compiles source files 105 into compiled ".class" files (or class files) 107 that contain bytecodes executable by a virtual machine. Bytecode class files 107 are stored (e.g., in temporary or permanent storage) on server 100, and are available for download over network 101.

Client platform 102 contains a virtual machine (VM) 111 which, through the use of available native operating system (O/S) calls 112, is able to execute bytecode class files and execute native O/S calls when necessary during execution. An example interaction between the client platform and the server is the request and response in HTTP (hypertext transport protocol). HTTP is a commonly used method for transferring HTML (hypertext markup language) documents, a type of web pages, across the Internet.

As Java™ class files are often referenced to within an HTML document, requests for HTML documents often trigger the transfer of compiled Java™ classes as well. For example, when a browser application executing on client platform 102 requests an HTML document, such as by forwarding URL (universal resource locator) 109 to web server 108, the browser automatically initiates the download of the class files 107 identified in the HTML document. Class files 107 are typically downloaded from the server and loaded into virtual machine 111 individually as needed. The virtual machine locates and loads each class file, parses the class file format, allocates memory for various components of the class, and links the class with other already loaded classes. This process makes the bytecode in the class readily executable by the virtual machine. An example of the entire class loading process is the use of applets on web pages. A user may request a web page via his browser. Embedded on the page is a reference to a game applet. Upon receipt of the request by Server 100, the applet is downloaded to the browser along with the page. The applet is then loaded onto the Virtual Machine 111 on the user's computer (Client 102) and executed. The user can then begin to interact with the applet just as with any programs on his computer.

Plug-In Development

Figure 2:
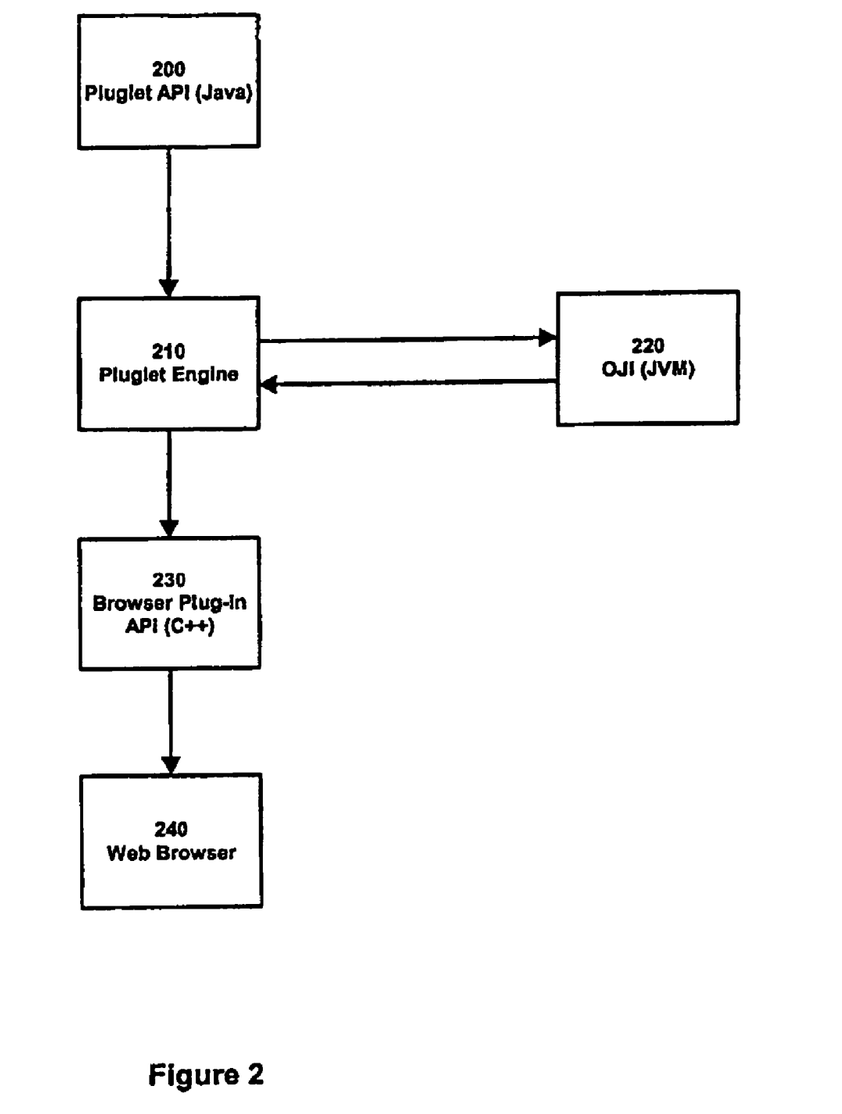
FIG. 2 shows an example of implementing a platform independent plug-in for a browser environment.

There is a mechanism for developing plug-ins in a platform independent programming language. For instance, pluglets are plug-ins developed in the Java™ programming language. FIG. 2 shows an example of an existing implementation of Pluglet in the browser environment. Within FIG. 2 are several Application Programming Interfaces (APIs). API refers to a collection of software modules available for use. An API declares the behavior of the collection so programmers can understand how to use the software modules within an API and whether different APIs are compatible with one another.

In FIG. 2, Pluglet API 200 interacts with Pluglet Engine 210, which allows the Java based Pluglet API 200 to interact with the C++ based Browser Plug-in API 230 via Java Native Interface (JNI).

Thus Pluglet Engine 210 serves as an intermediary between Pluglet API 200 (in Java™) and Browser Plug-in API 230 (in C++). Pluglet Engine 210 also handles calls to Open JVM Interface (OJI), which plays the role of the Java Virtual Machine (JVM) that is required for the execution of Java bytecodes found in Pluglets.

One of the main drawbacks of a such a system depicted in FIG. 2 is the reliance on native interfaces such as Java Native Interface (JNI). Considerable development effort is needed to develop an interface similar to Pluglet Engine 210 for each type of browser. To develop each interface, new modules called wrapper codes must be implemented using JNI to connect the native programming language of the browser with the programming language of pluglets. The development process of wrapper codes is often a tedious and error prone process. There are also performance concerns. For example, during the execution of the pluglets on the Solaris environment, using JNI requires two copies of JVM to be stored in run-time memory. This takes up memory resources of the system and slows execution.

BlackConnect and XPCOM

XPCOM (Cross Platform Component Object Model) is a technology that allows software components written in various programming languages to communicate with one another within the browser environment. XPCOM is available as part of Mozilla™ browser project. BlackConnect technology was developed to enable software components written in Java™ to take advantage of XPCOM. With BlackConnect and XPCOM, Java components can communicate with other software components written in various programming languages within the browser environment. The combination of BlackConnect and XPCOM greatly enhances the efficiency of the software development process. For example, a game programmer developing in Java™ can take advantage of an existing graphic rendering engine component written in C++, instead of creating such component himself in Java™.

SUMMARY OF THE INVENTION

Embodiments of the present invention relate to the implementation of an Application Programming Interface (API) that enables platform independent plug-ins to work with browser applications. In one or more embodiments of the present invention, the API allows platform independent plug-ins to use XPCOM (Cross Platform Component Object Model), a technology that allows software components written in various programming languages to communicate with one another within the browser environment. In another embodiment, the platform independent plug-in is written in the Java™ programming language and is termed a "pluglet."

In one or more embodiments of the present invention, the API enables platform in dependent plug-ins to take advantage of existing BlackConnect and Scriptable Plug-In API technologies to integrate with the native browser plug-in API. Embodiments of the present invention allows the current platform independent plug-in API and browser API to remain unchanged, which ensures backward code compatibility. Furthermore, embodiments of the present invention enables platform independent plug-ins to communicate and use components created in native programming languages such as C++. This promotes component reuse and eases the development effort.

One embodiment of the present invention implements an input stream interface, an output stream interface, a plug-in interface, a plug-in instance interface, a plug-in instance peer interface, two plug-in manager interfaces, a plug-in stream info interface, a plug-in stream listener interface, and two plug-in tag information interfaces.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Embodiments of the present invention relates to the implementation of an Application Programming Interface (API) that enables platform independent plug-ins to work with browser applications. In the following description, numerous specific details are set forth to provide a more thorough description of embodiments of the invention. It will be apparent, however, to one skilled in the art, that embodiments of the invention may be practiced without these specific details. In other instances, well known features have not been described in detail so as not to obscure the invention.

Platform Independent Plug-ins

Figure 3:
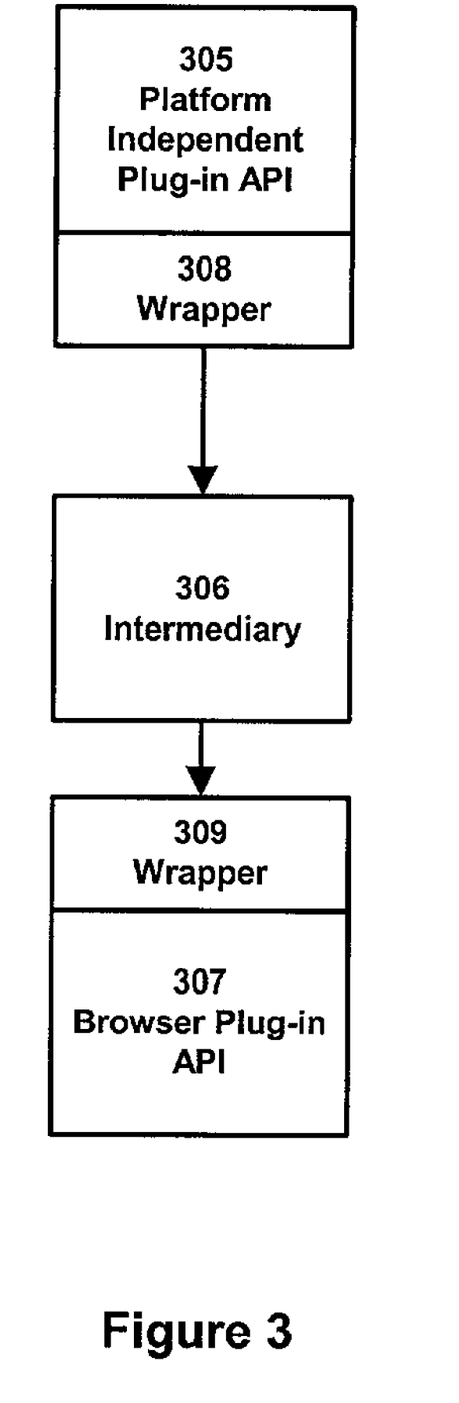
FIG. 3 shows a method for connecting a platform independent plug-in API to a browser plug-in API according to an embodiment of the present invention.

FIG. 3 shows an embodiment of the present invention. Platform Independent Plug-in API 305 is connected to Intermediary 306 through Wrapper 308. Wrapper 308 is an API that allows Platform Plug-in API 305 to use Intermediary 306 by providing a translation between the two APIs. Intermediary 306 is connected to Browser Plug-in API 307 through Wrapper 309. In one embodiment of the present invention, Intermediary 306 is a API that provides any necessary code translation and interfaces to bridge Platform Independent Plug-in API 305 and Browser Plug-in API 307. Wrapper 308 and Wrapper 309 preserve both Browser Plug-in API 307 and Platform Plug-in 305 APIs while giving them access to Intermediary 306. Thus backward compatibility for both APIs is achieved. In one embodiment of the invention, Wrapper 309 is a scriptable plug-in API.

Scriptable Plug-in API

Figure 4:
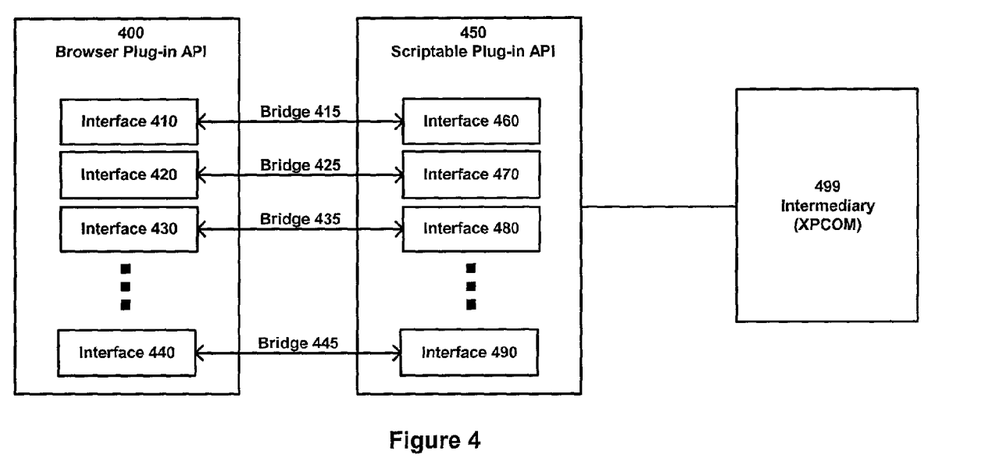
FIG. 4 is a diagram illustrating the relationship between a browser plug-in API and a scriptable plug-in API according to an embodiment of the present invention.

FIG. 4 illustrates the implementation of a backward-compatible scriptable plug-in API that is enabled by connecting non-scriptable Browser Plug-in API 400 to Scriptable Plug-in API 450. Both API 400 and API 450 can be implemented in any suitable programming language, such as C++, with the Scriptable Plug-In API 450 providing a channel by which the Browser Plug-in API 400 is accessed. Intermediary 499 uses Scriptable Plug-in API 450 to connect to Browser Plug-in API 400.

In one or more embodiments of the present invention, Intermediary 499 is an XPCOM API. XPCOM (Cross Platform Component Object Model) is a standardized framework that allows software components written in various programming languages to communicate with one another within the browser environment. Since XPCOM is a critical interface for interoperability, making it work with Browser Plug-in API 400 will allow Browser Plug-in API 400 to interface with a wide variety of APIs. Since XPCOM contains an interface that only works with scriptable interfaces and Browser Plug-in API 400 is not scriptable, Scriptable Plug-in API 450 provides a conduit for access to XPCOM (or Intermediary 499).

With connection established between Browser Plug-in API 400 and the standardized framework XPCOM, any API that is configured to operate with XPCOM now has access to Browser Plug-in API 400. This also works in the reverse direction meaning Browser Plug-in API 400 can now access any API that uses XPCOM.

Each interface in Scriptable Plug-in API 450 corresponds to an interface in Browser Plug-in API 400 and the corresponding interfaces are connected by bridges. Bridges are software modules that allow two incompatible interfaces to operate with each another. More specifically, bridges map the functionality of one interface to another interface. As such, with these bridges in place there is no need to change the existing non-scriptable Browser Plug-in API 400. Interface 460 corresponds to Interface 410 and both are connected by Bridge 415. Interface 470 corresponds to Interface 420 and both are connected by Bridge 425. Interface 480 corresponds to Interface 430 and both are connected by Bridge 435. Finally, Interface 490 corresponds to Interface 440 and both are connected by Bridge 445.

With Bridge 415 and Interface 460, non-scriptable Interface 410 can access Intermediary 499 and any API using Intermediary 499 can access Interface 410. The same mechanism is used in the other corresponding bridge and interface pairs. A complete description of the mechanisms and interfaces involved in connecting a scriptable plug-in API to a non-scriptable plug-in is described in co-pending U.S. patent application "Scriptable Plug-In Application Programming Interface", Ser. No. 10/023,008 filed on Dec. 21, 2001.

Implementing Platform Independent Plug-in API on Top of BlackConnect

Figure 5:
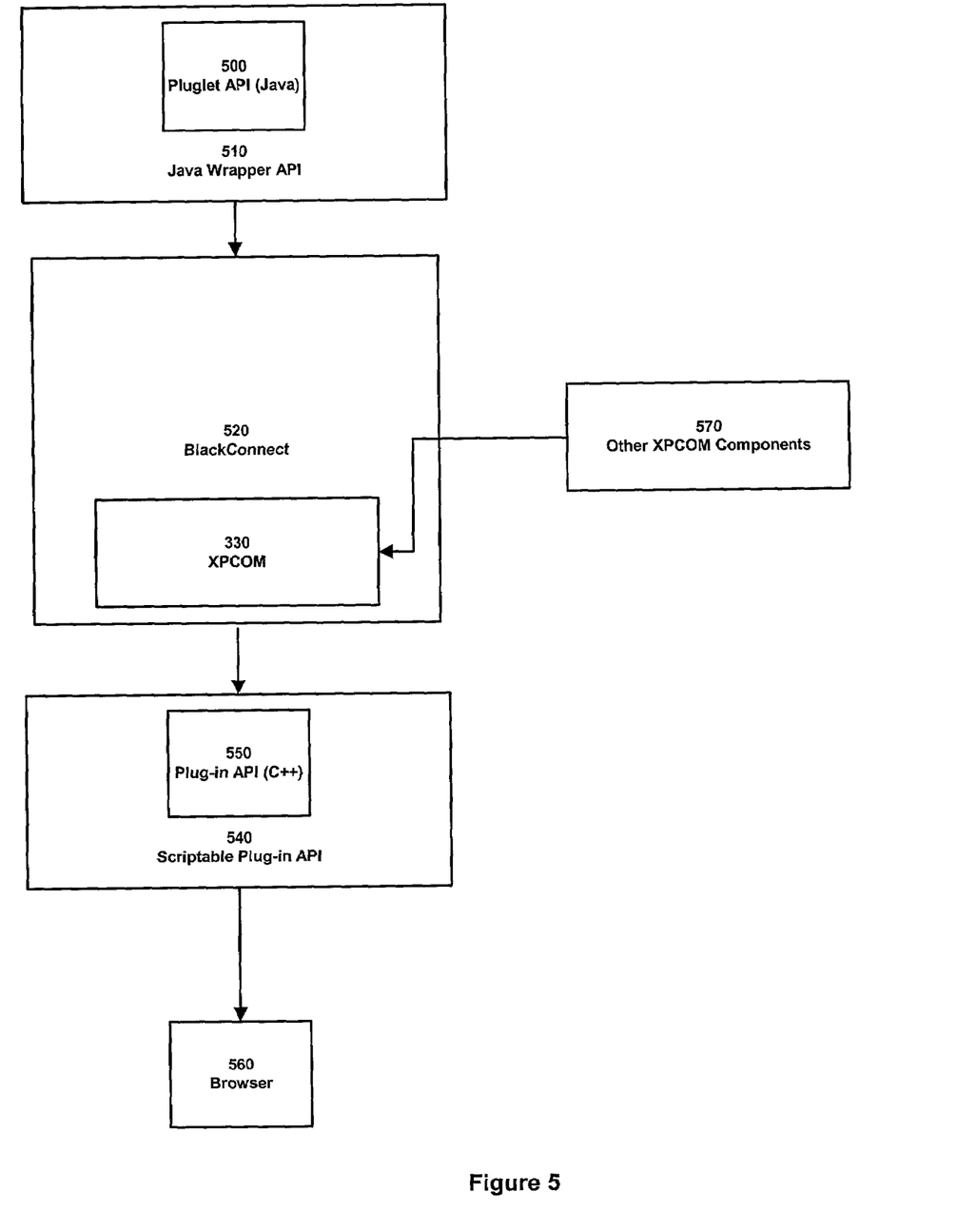
FIG. 5 is a method for implementing a Java Pluglet API according to an embodiment of the present invention.

In one embodiment of the present invention, Wrapper API 308 is a Java wrapper that enables platform independent plug-in API such as pluglet API to take advantage of an existing intermediary such as XPCOM. The Java wrapper connects platform independent plug-in API to an interface of XPCOM called BlackConnect. The BlackConnect technology enables software components written in Java to take advantage of XPCOM. With access to XPCOM, platform independent plug-in API such as pluglet API can access the browser plug-in API through the scriptable plug-in API shown in FIG. 4. FIG. 5 shows this overall architecture according to an embodiment of the invention that connects Pluglet API 500 to Browser Plug-in 550. The connection allows Pluglets, which are written in Java, to use the C++ based API of the Browser. Pluglet API 500 is wrapped with Java Wrapper API 510. This wrapper layer enables Pluglet API 500 to access BlackConnect 520. BlackConnect 520 is set of C++ libraries that allow Java components to become XPCOM components. XPCOM 530 is a standardized framework for writing cross-platform, modular software components. However, since XPCOM 530 does not support Java components, BlackConnect 520 is needed.

All XPCOM components need to have their own associated IDLs (Interface Description Language). IDLs serve as standardized interfaces for components to communicate each other, regardless of their implementation languages. Within XPCOM, an XPIDL compiler is used to create an IDL out of a software component written in C, C++, or Javascript, the three programming languages currently supported by XPCOM. BlackConnect works around this limitation by allowing the XPIDL compiler to make XPCOM components out of Java components. Since BlackConnect allows Java components to become XPCOM components, the ability to use BlackConnect via Java Wrapper API 510 enables the Java based Pluglet API 500 to communicate with other XPCOM components.

One requirement of BlackConnect is that the Java based XPCOM components only communicate with scriptable XPCOM components. Therefore, Scriptable Plug-in API 540 is needed to make Browser Plug-in API 550 scriptable before Pluglet API 500 interfaces with it. With the help of Java Wrapper API 510, Scriptable Plug-in API 540 and BlackConnect, Pluglet API 500 and the Browser Plug-in API 550 interface across the standardized framework of XPCOM. The final result is that the Java Pluglet API 500 connects with the C++ Browser Plug-in API 550 without relying on JNI (Java Native Interface) technology.

Bypassing JNI reduces development effort and in some cases improves run-time performance. Another advantage of the invention is that it allows the both the current Pluglet API and browser Plug-in APIs to remain unchanged. This helps ensure backward code compatibility. Furthermore, the present invention allows Pluglets to communicate and use other XPCOM components 570. This promotes component reuse and eases development effort.

Figure 6:
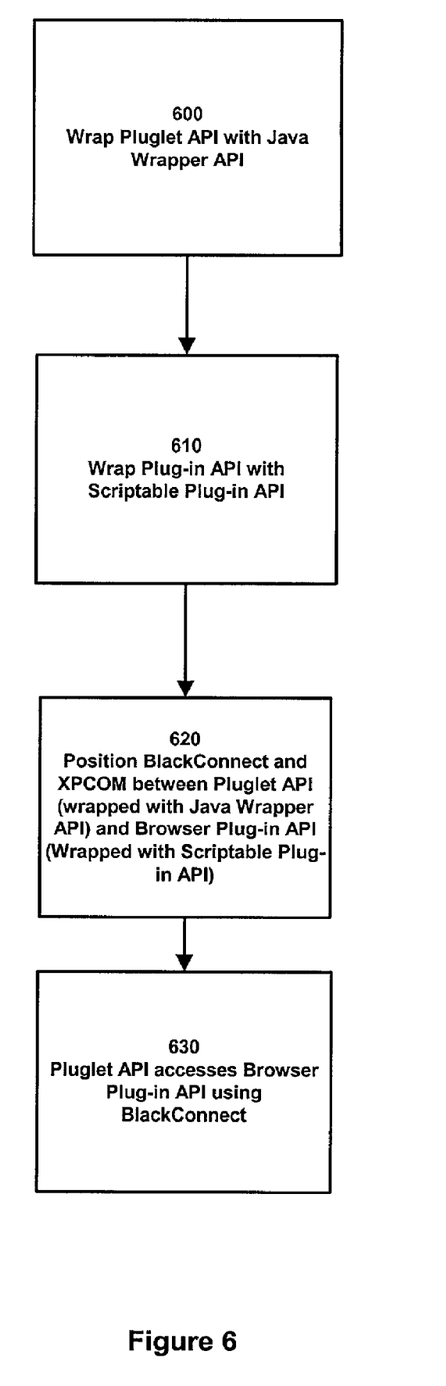
FIG. 6 is a flow chart illustrating the operation of an embodiment of the present invention.

FIG. 6 is a flow chart showing the operation of an embodiment of the present invention. In block 600, Pluglet API is first wrapped with Java Wrapper API. The wrapping involves creating a set of interfaces that connects Pluglet API and BlackConnect. Then, in block 610 Browser Plug-in API is wrapped with Scriptable Plug-in API. In block 620 BlackConnect and XPCOM are positioned between Pluglet API and Scriptable Plug-in API. Finally, in block 630 Pluglet API accesses Browser Plug-in API.

Figure 7:
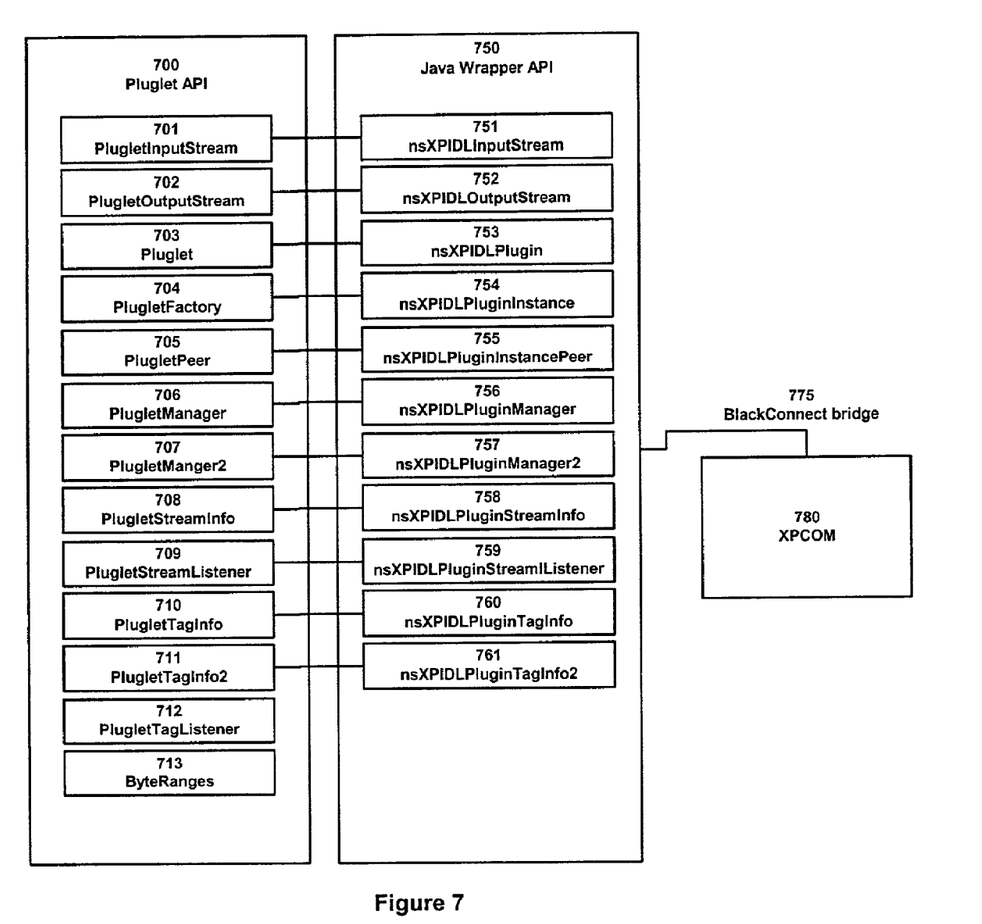
FIG. 7 shows the relationship between a Java Pluglet API and a Java Wrapper API according to another embodiment of the present invention.

FIG. 7 illustrates the interfaces of Pluglet API 700 and Java Wrapper API 750. In one embodiment of the present invention, both APIs are implemented in Java, with the Java Wrapper API enabling Pluglet API 700 to access BlackConnect bridge 775, which gives access to XPCOM 780. Java Wrapper API 750 allows Pluglet API 700 to conform to the IDL-compliant interface that BlackConnect bridge 775 requires to make the Pluglet API XPCOM compatible. The lines between the two APIs connect related interfaces with one another. For example, the nsXPIDLPluginTagInfo 760 interface is a wrapper for the PlugletTagInfo 710 interface and thus they are connected by a line in FIG. 7. In one embodiment the following interfaces are implemented in Java Wrapper API 750:

nsXPIDLInputStream 751, nsXPIDLOutputStream 752, nsXPIDLPlugin 753, nsXPIDLPluginInstance 754, nsXPIDLPluginInstancePeer 755, nsXPIDLPluginManager 756, nsXPIDLPluginManager2 757, nsXPIDLPluginStreamInfo 758, nsXPIDLPluginStreamListener 759, nsXPIDLPluginTagInfo 760, nsXPIDLPluginTagInfo2 761.

The interfaces of Java Wrapper API 750 are listed in details below:

nsXPIDLInputStream 751: provides a wrapper interface between BlackConnect bridge 775 and interface PlugletInputStream 701, which handles the input data stream for a browser plug-in

```
import org.mozilla.xpcom.*;
import org.mozilla.pluglet.*;
import org.mozilla.pluglet.mozilla.*;
import Java.io.*;
 public class nsXPIDLInputStream extends InputStream {
   public nsIXPIDLInputStream inputStream;
public nsXPIDLInputStream( nsIXPIDLInputStream inputStream ) {
     this.inputStream = inputStream;
   }
   public void close( ) {
     inputStream.close( );
   }
   public int available( ) {
     return inputStream.available( );
   }
   public int read(byte[ ] b, int off, int len) throws IOException {
     return inputStream.read( len, b );
   }
   public int read( ) throws IOException {
     byte buf[ ] = new byte [1];
     if( read( buf, 0, 1 ) < 0 ) {
       return −1;
     } else {
       return buf[0] & 0xff;
     }
   }
 }
}
``` nsXPIDLOutputStream 752: provides a wrapper interface between BlackConnect bridge 775 and interface PlugletOutputStream 702, which handles the output data stream for a browser plug-in

```
import org.mozilla.xpcom.*;
import org.mozilla.pluglet.*;
import org.mozilla.pluglet.mozilla.*;
import Java.io.*;
public class nsXPIDLOutputStream extends OutputStream {
  public nsIXPIDLOutputStream outputStream;
  public nsXPIDLOutputStream( nsIXPIDLOutputStream outputStream ) {
    this.outputStream = outputStream;
  }
  public void close( ) {
    outputStream.close( );
  }
  public void flush( ) {
    outputStream.flush( );
  }
  public void write(byte[ ] b, int off, int len) throws IOException {
    outputStream.write( len, b );
  }
  public void write( int b ) throws IOException {
    byte buf[ ] = new byte[1];
    buf[0] = (byte)b;
    write( buf, 0, 1 );
  }
}
``` nsXPIDLPlugin 753: provides a wrapper interface between BlackConnect bridge 775 and interface Pluglet 703, which defines the programming requirements for a browser plug-in

```
import org.mozilla.xpcom.*;
import org.mozilla.pluglet.*;
import org.mozilla.pluglet.mozilla.*;
public class nsXPIDLPlugin implements nsIXPIDLPlugin {
  public PlugletFactory plugin;
  public nsXPIDLPlugin( PlugletFactory plugin ) {
    this.plugin = plugin;
  }
  public Object createPluginInstance( nsISupports aOuter,
                                      IID iid,
                                      String pluginMIMEType ) {
    return plugin.createPluglet( pluginMIMEType );
  }
  public void initialize( ) {
    // ??? Where can I take PlugletManager in this place?
  }
  public void shutdown( ) {
    plugin.shutdown ( );
  }
  // from nsIFactory
  public void lockFactory( boolean lock ) {
  }
  public Object createInstance( nsISupports instance, IID iid ) {
    return createPluginInstance( instance, iid, null );
  }
  // from nsISupports
  public Object queryInterface( IID iid ) {
    Object result;
    if ( nsISupports.IID.equals(iid)
       || nsIXPIDLPlugin.IID.equals(iid) {
      result = this;
    } else {
      result = null;
    }
    return result;
  }
}
``` nsXPIDLPluginInstance 754: provides a wrapper interface between BlackConnect bridge 775 and interface PlugletFactory 704, which generates browser plug-in instances

```
import org.mozilla.xpcom.*;
import org.mozilla.pluglet.*;
import org.mozilla.pluglet.mozilla.*;
public class nsXPIDLPluginInstance implements
nsIXPIDLPluginInstance {
  public Pluglet instance;
  public nsXPIDLPluginInstance( Pluglet instance ) {
    this.instance = instance;
  }
  public void destroy( ) {
    instance.destroy( );
  }
  public void initialize( nsIXPIDLPluginInstancePeer peer ) {
    PlugletPeer pPeer = new nsXPIDLPluginInstancePeer( peer );
    instance.initialize( pPeer );
  }
  public nsIXPIDLPluginStreamListener newStream( ) {
    return new nsXPIDLPluginStreamListener( instance.newStream( ) );
  }
  public void start( ) {
    instance.start( );
  }
  public void stop( ) {
    instance.stop( );
  }
  // from nsISupports
  public Object queryInterface( IID iid ) {
    Object result;
    if( nsISupports.IID.equals(iid)
        || nsIXPIDLPluginInstance.IID.equals(iid) ) {
      result = this;
    } else {
      result = null;
    }
    return result;
  }
}
``` nsXPIDLPluginInstancePeer 755: provides a wrapper interface between BlackConnect bridge 775 and interface PlugletPeer 705, which defines the functional requirements for a browser plug-in to ensure compatibility with the browser

```
import org.mozilla.xpcom.*;
import org.mozilla.pluglet.*;
import org.mozilla.pluglet.mozilla.*;
public class nsXPIDLPluginInstancePeer implements PlugletPeer {
  public nsIXPIDLPluginInstancePeer instancePeer;
  public nsXPIDLPluginInstancePeer( nsIXPIDLPluginInstancePeer
instancePeer ) {
    this.instancePeer = instancePeer;
  }
  public Java.lang.String getMIMEType( ) {
    return instancePeer.getMIMEType( );
  }
  public int getMode( ) {
    return instancePeer.getMode( );
  }
  public Java.lang.String getValue(int variable) {
    return instancePeer.getValue( variable );
  }
  public Java.io.OutputStream newStream(Java.lang.String type,
Java.lang.String target) {
    return new nsXPIDLOutputStream( instancePeer.newStream( type,
target ) );
  }
  public void setWindowSize( int width, int height) {
    instancePeer.setWindowSize( width, height );
  }
  public void showStatus( Java.lang.String message ) {
    instancePeer.showStatus( message );
  }
```

-continued

```
  public PlugletTagInfo getTagInfo( ) {
    return new nsXPIDLPluginTagInfo2( instancePeer.getTagInfo( ) );
  }
}
``` nsXPIDLPluginManager 756: provides a wrapper interface between BlackConnect bridge 775 and interface PlugletManager 706, which manages interaction between browser plug-in instances and the browser

```
import org.mozilla.xpcom.*;
import org.mozilla.pluglet.*;
import org.mozilla.pluglet.mozilla.*;
public class nsXPIDLPluginManager implements PlugletManager {
  public nsIXPIDLPluginManager pluginManager;
  public nsXPIDLPluginManager( ) {
  }
  public nsXPIDLPluginManager( nsILXPIDLPluginManager
pluginManager ) {
    this.pluginManager = pluginManager;
  }
  public void getURL( Pluglet pluglet,
            Java.net.URL url,
            Java.lang.String target,
            PlugletStreamListener streamListener,
            Java.lang.String altHost,
            Java.net.URL referrer,
            boolean forceJSEnabled ) {
    nsISupports pInstance = new nsXPIDLPluginInstance ( pluglet );
    nsIXPIDLPluginStreamListener sListener = new
nsXPIDLPluginStreamListener( streamListener );
    pluginManager.getURL( pInstance,
                url.toString( ),
                target,
                sListener,
                altHost,
                referrer.toString( ),
                forceJSEnabled );
  }
  public void postURL( Pluglet pluglet,
            Java.net.URL url,
            int postDataLen,
            byte[ ] postData,
            boolean isFile,
            Java.lang.String target,
            PlugletStreamListener streamListener,
            Java.lang.String altHost,
            Java.net.URL referrer,
            boolean forceJSEnabled,
            int postHeadersLength,
            byte[ ] postHeaders) {
    nsISupports pInstance = new nsXPIDLPluginInstance ( pluglet );
    nsIXPIDLPluginStreamListener sListener = new
nsXPIDLPluginStreamListener( streamListener );
    pluginManager.postURL( pInstance,
                url.toString( ),
                postDataLen,
                postData,
                postHeadersLength,
                new String(postHeaders),
                isFile,
                target,
                sListener,
                altHost,
                referrer.toString( ),
                forceJSEnabled );
  }
  public void reloadPluglets( boolean reloadPages ) {
    pluginManager.reloadPlugins( reloadPages );
  }
  public Java.lang.String userAgent( ) {
    return pluginManager.userAgent( );
  }
}
``` nsXPIDLPluginManager2 757: provides a wrapper interface between BlackConnect bridge 775 and interface PlugletManager2 707, which is a supporting interface for PlugletManager 706

```java
import org.mozilla.xpcom.*;
import org.mozilla.pluglet.*;
import org.mozilla.pluglet.mozilla.*;
public class nsXPIDLPluginManager2 extends nsXPIDLPluginManager
implements PlugletManager2 {
    public nsIXPIDLPluginManager2 pluginManager;
    public nsXPIDLPluginManager2( nsIXPIDLPluginManager2
pluginManager ) {
        this.pluginManager = pluginManager;
    }
    public void beginWaitCursor( ) {
        pluginManager.beginWaitCursor( );
    }
    public void endWaitCursor( ) {
        pluginManager.endWaitCursor( );
    }
    public String findProxyForURL( Java.net.URL url ) {
        return pluginManager.findProxyForURL( url.toString( ) );
    }
    public boolean supportsURLProtocol( String protocol ) {
        return pluginManager.supportsURLProtocol( protocol );
    }
    public boolean isURLProtocolSupported( String protocol ) {
        return pluginManager.supportsURLProtocol( protocol );
    }
}
``` nsXPIDLPluginStreamInfo 758: provides a wrapper interface between BlackConnect bridge 775 and interface PlugletStreamInfo 708, which gives browser plug-in instances access to information on incoming data stream

```java
import org.mozilla.xpcom.*;
import org.mozilla.pluglet.*;
import org.mozilla.pluglet.mozilla.*;
public class nsXPIDLPluginStreamInfo implements PlugletStreamInfo {
    public nsIXPIDLPluginStreamInfo streamInfo;
    public nsXPIDLPluginStreamInfo( nsIXPIDLPluginStreamInfo
streamInfo ) {
        this.streamInfo = streamInfo;
    }
    public Java.lang.String getContentType( ) {
        return streamInfo.getContentType( );
    }
    public int getLastModified( ) {
        return streamInfo.getLastModified( );
    }
    public int getLength( ) {
        return streamInfo.getLength( );
    }
    public Java.lang.String getURL( ) {
        return streamInfo.getURL( );
    }
    public boolean isSeekable( ) {
        return streamInfo.isSeekable( );
    }
    public void requestRead( ByteRanges ranges ) {
    }
}
``` nsXPIDLPluginStreamListener 759: provides a wrapper interface between BlackConnect bridge 775 and interface PlugletStreamListener 709, which gives browser plug-in instances access to incoming data stream

```java
import org.mozilla.xpcom.*;
import org.mozilla.pluglet.*;
import org.mozilla.pluglet.mozilla.*;
public class nsXPIDLPluginStreamListener implements
nsIXPIDLPluginStreamListener {
    public PlugletStreamListener streamListener;
    public nsXPIDLPluginStreamListener ( PlugletStreamListener
streamListener ) {
        this.streamListener = streamListener;
    }
    public int getStreamType( ) {
        return streamListener.getStreamType( );
    }
    public void onDataAvailable( nsIXPIDLPluginStreamInfo streamInfo,
                                 nsIXPIDLInputStream input,
                                 int length) {
        PlugletStreamInfo sInfo = new
nsXPIDLPluginStreamInfo( streamInfo );
        Java.io.InputStream iStream = new nsXPIDLInputStream( input );
        streamListener.onDataAvailable( sInfo, iStream, length );
    }
    public void onFileAvailable( nsIXPIDLPluginStreamInfo streamInfo,
                                 String fileName ) {
        PlugletStreamInfo sInfo = new
nsXPIDLPluginStreamInfo( streamInfo );
        streamListener.onFileAvailable( sInfo, fileName );
    }
    public void onStartBinding( nsIXPIDLPluginStreamInfo streamInfo ) {
        PlugletStreamInfo sInfo = new
nsXPIDLPluginStreamInfo( streamInfo );
        streamListener.onStartBinding( sInfo );
    }
    public void onStopBinding( nsIXPIDLPluginStreamInfo streamInfo, int
status) {
        PlugletStreamInfo sInfo = new
nsXPIDLPluginStreamInfo( streamInfo );
        streamListener.onStopBinding( sInfo, status );
    }
    // from nsISupports
    public Object queryInterface( IID iid ) {
        Object result;
        if( nsISupports.IID.equals(iid)
            || nsIXPIDLPluginStreamListener.IID.equals(iid) ) {
            result = this;
        } else {
            result = null;
        }
        return result;
    }
}
``` nsXPIDLPluginTagInfo 760: provides a wrapper interface between BlackConnect bridge 775 and interface PlugletTagInfo 710, which gives browser plug-in instances access to information on the HTML tags of the calling page within the browser

```java
import org.mozilla.xpcom.*;
import org.mozilla.pluglet.*;
import org.mozilla.pluglet.mozilla.*;
public class nsXPIDLPluginTagInfo implements PlugletTagInfo {
    public nsIXPIDLPluginTagInfo tagInfo;
    public String getAttribute( String name ) {
        return tagInfo.getAttribute( name );
    }
    public Java.util.Properties getAttributes( ) {
        // get atts
        int[ ] count = new int[1];
        String[ ] [ ] names = new String[1] [ ];
        String[ ] [ ] values = new String[1] [ ];
        tagInfo.getAttributes( count, names, values );
        // create props
        Java.util.Properties props = new Java.util.Properties( );
```

```
     for( int i = 0; i < count[0]; i++ ) {
        props.setProperty( names[0] [i], values[0] [i] );
     }
     // return props
     return props;
  }
  public Object getDOMElement( ) {
     return null;
  }
}
``` nsXPIDLPluginTagInfo2 761: provides a wrapper interface between BlackConnect bridge 775 and interface Pluglet-TagInfo2 711, which is a supporting interface of Pluglet-TagInfo 710

```
import org.mozilla.xpcom.*;
import org.mozilla.pluglet.*;
import org.mozilla.pluglet.mozilla.*;
public class nsXPIDLPluginTagInfo2 extends nsXPIDLPluginTagInfo
implements gIetTagInfo2 {
  public nsIXPIDLPluginTagInfo2 tagInfo;
  public nsXPIDLPluginTagInfo2( nsIXPIDLPluginTagInfo2 tagInfo ) {
     this.tagInfo = tagInfo;
  }
  public String getAlignment( ) {
     return tagInfo.getAlignment( );
  }
  public String getParameter( String name ) {
     return tagInfo.getParameter( name );
  }
  public Java.util.Properties getParameters( ) {
     // get atts
     int[ ] count = new int[1];
     String[ ] [ ] names = new String[1] [ ];
     String[ ] [ ] values = new String[1] [ ];
     tagInfo.getParameters( count, names, values );
     // create props
     Java.util.Properties props = new Java.util.Properties( );
     for( int i = 0; i < count[0]; i++ ) {
        props.setProperty( names[0] [i], values[0] [i] );
     }
     // return props
     return props;
  }
  public int getBorderHorizSpace( ) {
     return tagInfo.getBorderHorizSpace( );
  }
  public int getBorderVertSpace( ) {
     return tagInfo.getBorderVertSpace( );
  }
  public String getDocumentBase( ) {
     return tagInfo.getDocumentBase( );
  }
  public String getDocumentEncoding( ) {
     return tagInfo.getDocumentEncoding( );
  }
  public String getTagText( ) {
     return tagInfo.getTagText( );
  }
  public String getTagType( ) {
     return tagInfo.getTagType( );
  }
  public int getUniqueID( ) {
     return tagInfo.getUniqueID( );
  }
  public int getHeight( ) {
     return tagInfo.getHeight( );
  }
  public int getWidth( ) {
     return tagInfo.getWidth( );
  }
```

```
  public Object getDOMElement( ) {
     return null;
  }
}
```

Embodiment of Computer Execution Environment (Hardware)

Figure 8:
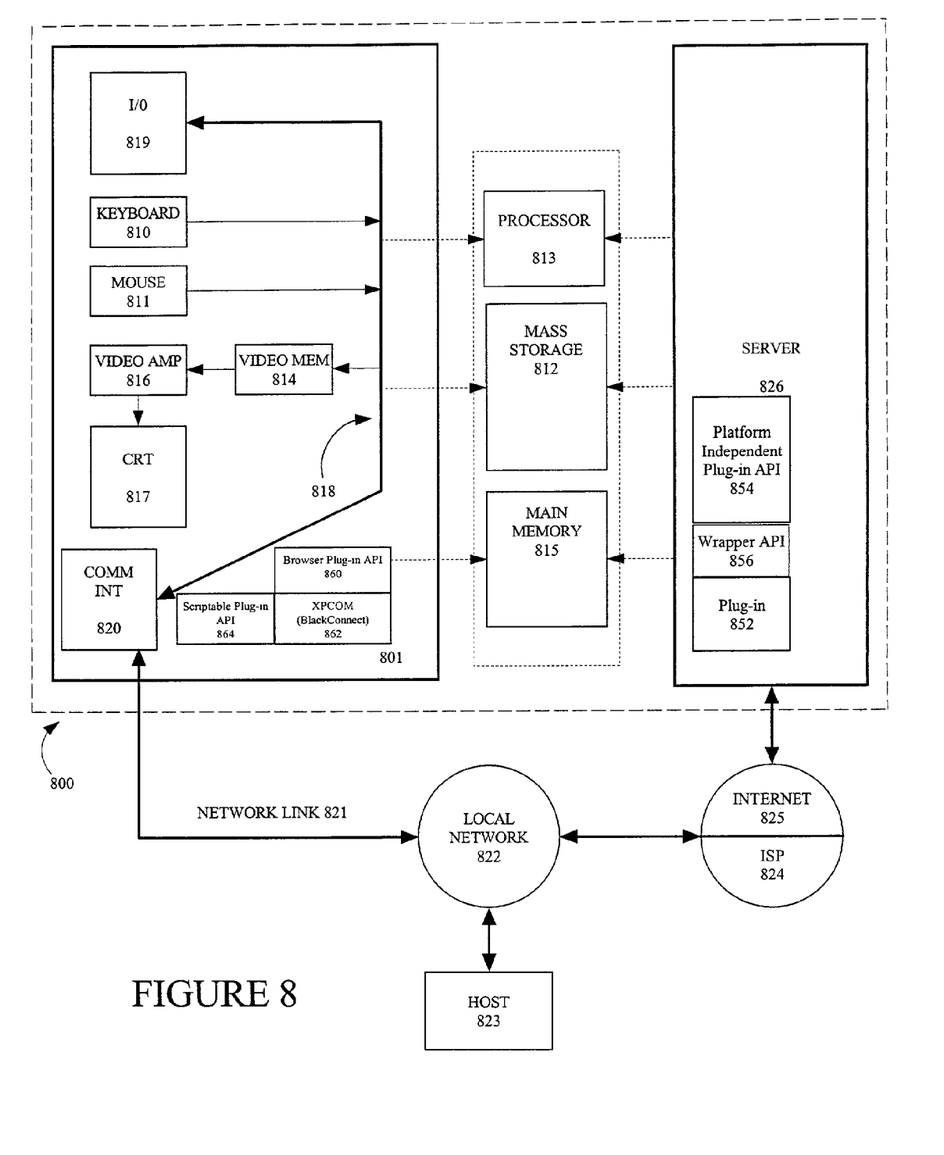
FIG. 8 is an embodiment of a general purpose computer environment.

An embodiment of the invention can be implemented as computer software in the form of computer readable program code executed in a general purpose computing environment such as environment 800 illustrated in FIG. 8, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 810 and mouse 811 are coupled to a system bus 818. The keyboard and mouse are for introducing user input to the computer system and communicating that user input to central processing unit (CPU) 813. Other suitable input devices may be used in addition to, or in place of, the mouse 811 and keyboard 810. I/O (input/output) unit 819 coupled to bi-directional system bus 818 represents such I/O elements as a printer, A/V (audio/video) I/O, etc.

Computer 801 may include a communication interface 820 coupled to bus 818. Communication interface 820 provides a two-way data communication coupling via a network link 821 to a local network 822. For example, if communication interface 820 is an integrated services digital network (ISDN) card or a modem, communication interface 820 provides a data communication connection to the corresponding type of telephone line, which comprises part of network link 821. If communication interface 820 is a local area network (LAN) card, communication interface 820 provides a data communication connection via network link 821 to a compatible LAN. Wireless links are also possible. In any such implementation, communication interface 820 sends and receives electrical, electromagnetic or optical signals which carry digital data streams representing various types of information.

Network link 821 typically provides data communication through one or more networks to other data devices. For example, network link 821 may provide a connection through local network 822 to local server computer 823 or to data equipment operated by ISP 824. ISP 824 in turn provides data communication services through the world wide packet data communication network now commonly referred to as the "Internet" 825. Local network 822 and Internet 825 both use electrical, electromagnetic or optical signals which carry digital data streams. The signals through the various networks and the signals on network link 821 and through communication interface 820, which carry the digital data to and from computer 800, are exemplary forms of carrier waves transporting the information.

Processor 813 may reside wholly on client computer 801 or wholly on server 826 or processor 813 may have its computational power distributed between computer 801 and server 826. Server 826 symbolically is represented in FIG. 8 as one unit, but server 826 can also be distributed between multiple "tiers". In one embodiment, server 826 comprises a middle and back tier where application logic executes in the middle tier and persistent data is obtained in the back tier. In the case where processor 813 resides wholly on server 826, the results of the computations performed by processor 813 are transmitted to computer 801 via Internet 825, Internet Service Provider (ISP) 824, local network 822 and communication interface 820. In this way, computer 801 is able to display the results of the computation to a user in the form of output.

Computer 801 includes a video memory 814, main memory 815 and mass storage 812, all coupled to bi-directional system bus 818 along with keyboard 810, mouse 811 and processor 813. As with processor 813, in various computing environments, main memory 815 and mass storage 812, can reside wholly on server 826 or computer 801, or they may be distributed between the two. Examples of systems where processor 813, main memory 815, and mass storage 812 are distributed between computer 801 and server 826 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 812 may include both fixed and removable media, such as magnetic, optical or magnetic optical storage systems or any other available mass storage technology. Bus 818 may contain, for example, thirty-two address lines for addressing video memory 814 or main memory 815. The system bus 818 also includes, for example, a 32-bit data bus for transferring data between and among the components, such as processor 813, main memory 815, video memory 814 and mass storage 812. Alternatively, multiplex data/address lines may be used instead of separate data and address lines.

In one embodiment of the invention, the processor 813 is a SPARC microprocessor from Sun Microsystems, Inc., a microprocessor manufactured by Motorola, such as the 680X0 processor, or a microprocessor manufactured by Intel, such as the 80X86 or Pentium processor. However, any other suitable microprocessor or microcomputer may be utilized. Main memory 815 is comprised of dynamic random access memory (DRAM). Video memory 814 is a dual-ported video random access memory. One port of the video memory 814 is coupled to video amplifier 816. The video amplifier 816 is used to drive the cathode ray tube (CRT) raster monitor 817. Video amplifier 816 is well known in the art and may be implemented by any suitable apparatus. This circuitry converts pixel data stored in video memory 814 to a raster signal suitable for use by monitor 817. Monitor 817 is a type of monitor suitable for displaying graphic images.

Computer 801 can send messages and receive data, including program code, through the network(s), network link 821, and communication interface 820. In the Internet example, remote server computer 826 might transmit a requested code for an application program through Internet 825, ISP 824, local network 822 and communication interface 820. The received code may be executed by processor 813 as it is received, and/or stored in mass storage 812, or other non-volatile storage for later execution. In this manner, computer 800 may obtain application code in the form of a carrier wave. Alternatively, remote server computer 826 may execute applications using processor 813, and utilize mass storage 812, and/or video memory 815. The results of the execution at server 826 are then transmitted through Internet 825, ISP 824, local network 822 and communication interface 820. In this example, computer 801 performs only input and output functions.

In one embodiment of the present invention, the platform independent plug-in 852 can reside on server 826. Browser plug-in API 860, as part of a browser, is on computer 801. The browser can download platform independent plug-in 852 from server 826 when it encounters a plug-in reference on an HTML page. XPCOM 862 and scriptable plug-in API 864 also reside with the browser plug-in API 860 on computer 801. They enable the execution of platform independent plug-in 852 on computer 801. In one embodiment of the present invention, platform independent plug-in 852 is developed earlier on the server with platform independent plug-in API 854 and wrapper API 856.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, an implementation of connecting platform independent plug-ins to browser applications is described in conjunction with one or more specific embodiments. The invention is defined by the claims and their full scope of equivalents.

The invention claimed is:

1. An Application Programming Interface (API), executing in a computer system comprising:
   a platform-independent plug-in API including a wrapper;
   a browser plug-in API; and
   an intermediary between said platform-independent plug-in API and said browser plug-in API wherein said wrapper is used to connect said platform independent plug-in API to said intermediary, wherein said wrapper further comprises: an interface connecting an input stream interface of said platform independent API to said intermediary; an interface connecting an output stream interface of said platform independent API to said intermediary; an interface connecting a pluglet interface of said platform independent API to said intermediary; an interface connecting a pluglet factory interface of said platform independent API to said intermediary; an interface connecting a pluglet peer interface of said platform independent API to said intermediary; an interface connecting a first pluglet manager interface of said platform independent API to said intermediary; an interface connecting a second pluglet manager interface of said platform independent API to said intermediary; an interface connecting a pluglet stream information interface of said platform independent API to said intermediary; an interface connecting a pluglet stream listener interface of said platform independent API to said intermediary; an interface connecting a first pluglet tag information interface of said platform independent API to said intermediary; and an interface connecting a second pluglet tag information interface of said platform independent API to said intermediary.

2. A method for implementing an API, executing in a computer system comprising:
   obtaining a platform-independent plug-in API including a wrapper;
   obtaining a browser plug-in API; and
   positioning an intermediary between said platform-independent plug-in API and said browser plug-in API wherein said wrapper is used to connect said platform independent plug-in API to said intermediary, wherein said wrapper further comprises: an interface connecting an input stream interface of said platform independent API to said intermediary; an interface connecting an output stream interface of said platform independent API to said intermediary; an interface connecting a pluglet interface of said platform independent API to said intermediary; an interface connecting a pluglet factory interface of said platform independent API to said intermediary; an interface connecting a pluglet peer interface of said platform independent API to said intermediary; an interface connecting a first pluglet manager interface of said platform independent API to said intermediary; an interface connecting a second pluglet manager interface of said platform independent API to said intermediary; an interface connecting a pluglet stream information interface of said platform independent API to said intermediary; an interface connecting a pluglet stream listener interface of said platform independent API to said intermediary; an interface connecting a first pluglet tag information interface of said platform independent API to said intermediary; and an interface connecting a second pluglet tag information interface of said platform independent API to said intermediary.

3. A computer program product comprising:

a storage computer usable medium having computer readable program code embodied therein configured to implement an API, said computer program product comprising:

computer readable code configured to cause a computer to define a platform-independent plug-in API including a wrapper;

computer readable code configured to cause a computer to define a browser plug-in API; and computer readable code configured to cause a computer to position an intermediary between said platform-independent plug-in API and said browser plug-in API wherein said wrapper is used to connect said platform independent plug-in API to said intermediary, wherein said wrapper further comprises: an interface connecting an input stream interface of said platform independent API to said intermediary; an interface connecting an output stream interface of said platform independent API to said intermediary; an interface connecting a pluglet interface of said platform independent API to said intermediary; an interface connecting a pluglet factory interface of said platform independent API to said intermediary; an interface connecting a pluglet peer interface of said platform independent API to said intermediary; an interface connecting a first pluglet manager interface of said platform independent API to said intermediary; an interface connecting a second pluglet manager interface of said platform independent API to said intermediary; an interface connecting a pluglet stream information interface of said platform independent API to said intermediary; an interface connecting a pluglet stream listener interface of said platform independent API to said intermediary; an interface connecting a first pluglet tag information interface of said platform independent API to said intermediary; and an interface connecting a second pluglet tag information interface of said platform independent API to said intermediary.

* * * * *